United States Patent
Ochi

(10) Patent No.: US 10,063,723 B2
(45) Date of Patent: Aug. 28, 2018

(54) DISPLAY INPUT DEVICE FOR SUCCESSIVELY REDUCING THE SIZE OF A SCREEN ELEMENT DURING A SELECTED PROCESSING OF AN IMAGE FORMING APPARATUS

(71) Applicant: KYOCERA Document Solutions Inc., Osaka (JP)

(72) Inventor: Makoto Ochi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 167 days.

(21) Appl. No.: 15/018,298

(22) Filed: Feb. 8, 2016

(65) Prior Publication Data

US 2016/0241741 A1 Aug. 18, 2016

(30) Foreign Application Priority Data

Feb. 18, 2015 (JP) ................................ 2015-029414

(51) Int. Cl.
 *H04N 1/00* (2006.01)
(52) U.S. Cl.
 CPC ..... *H04N 1/00469* (2013.01); *H04N 1/00381* (2013.01); *H04N 1/00411* (2013.01)
(58) Field of Classification Search
 CPC .................. H04N 1/00469; H04N 1/00411
 See application file for complete search history.

(56) References Cited

U.S. PATENT DOCUMENTS

| | | | | |
|---|---|---|---|---|
| 9,411,450 | B2* | 8/2016 | Shimizu | G06F 3/0488 |
| 2011/0279363 | A1* | 11/2011 | Shoji | G06F 3/04886 345/156 |
| 2012/0165071 | A1* | 6/2012 | Hsu | G06F 1/1632 455/557 |
| 2014/0096232 | A1* | 4/2014 | Tanabe | G06F 21/31 726/16 |
| 2015/0046878 | A1* | 2/2015 | Sutou | G06F 3/04817 715/835 |
| 2016/0078659 | A1* | 3/2016 | Bartkiewicz | G06F 3/0482 715/771 |
| 2016/0361650 | A1* | 12/2016 | Terao | A63F 13/426 |

FOREIGN PATENT DOCUMENTS

JP 2008-283237 A 11/2008

* cited by examiner

*Primary Examiner* — Benjamin O Dulaney
(74) *Attorney, Agent, or Firm* — Stein IP, LLC

(57) ABSTRACT

A display input device includes a display portion, a touch panel portion and a control portion, and when in a login state, a predetermined processing start time is reached, reduction processing is performed in which in a screen being presently displaced, a display size of a logout key is maintained and in which a display size of a reduction target element that is a screen element other than the logout key is reduced.

2 Claims, 13 Drawing Sheets

DISPLAY INPUT DEVICE FOR SUCCESSIVELY REDUCING THE SIZE OF A SCREEN ELEMENT DURING A SELECTED PROCESSING OF AN IMAGE FORMING APPARATUS

This application is based upon and claims the benefit of priority from the corresponding Japanese Patent Application No. 2015-029414 filed on Feb. 18, 2015, the entire contents of which are incorporated herein by reference.

BACKGROUND

The present disclosure relates to a display input device and an image forming apparatus including such a display input device and a method of controlling a display input device.

Conventionally, an image forming apparatus that has a login function (user authentication function) is known. In such an image forming apparatus, an input of identification information (information for performing user authentication) is received from a user, and whether or not a login operation is allowed (whether or not the use of the image forming apparatus is allowed) is determined based on the identification information. Then, when the image forming apparatus allows the login operation, the image forming apparatus is brought into a login state (a state where the image forming apparatus can be used).

Here, when the image forming apparatus is left in the login state, in the meantime, the image forming apparatus may be used in an unauthorized manner by a third person (person who is not authorized to use the image forming apparatus). Hence, after the use of the image forming apparatus, it is preferable to quickly perform a logout operation. However, a user may forget to perform a logout operation.

Hence, conventionally, various technologies for reducing the leaving of an image forming apparatus in a login state are proposed. For example, in an image forming apparatus, when it is detected that a start key for reception of an instruction to perform a job is pressed down, a display screen of a touch panel display in the image forming apparatus is switched to a logout confirmation screen (a dedicated screen for reception of a logout operation), and thus a user is prompted to perform the logout operation.

SUMMARY

According to a first aspect of the present disclosure, there is provided a display input device that is installed in an image forming apparatus, that receives an input of identification information for confirming whether or not a user is a valid user in a logout state where a setting on a job to be performed in the image forming apparatus is not received and that changes, when it is confirmed that the user inputting the identification information is the valid user, to a login state where the setting on the job to be performed in the image forming apparatus is received, the display input device including a display portion, a touch panel portion and a control portion. The display portion displays, in the login state, a logout key for receiving a logout operation which is an operation of providing an instruction to change to the logout state. The touch panel portion is used for detecting a touch operation on a screen of the display portion. The control portion determines, when detecting the touch operation on the logout key based on an output of the touch panel portion, that the logout operation is performed so as to change from the login state to the logout state. When in the login state, a predetermined processing start time is reached, the display portion performs reduction processing in which in the screen being presently displaced, the display size of the logout key is maintained and in which the display size of a reduction target element that is a screen element other than the logout key is reduced.

According to a second aspect of the present disclosure, there is provided an image forming apparatus that includes the display input device described above.

According to a third aspect of the present disclosure, there is provided a method of controlling a display input device that is installed in an image forming apparatus, that receives an input of identification information for confirming whether or not a user is a valid user in a logout state where a setting on a job to be performed in the image forming apparatus is not received and that changes, when it is confirmed that the user inputting the identification information is the valid user, to a login state where the setting on the job to be performed in the image forming apparatus is received, the method including: a step of displaying, in the login state, a logout key for receiving a logout operation which is an operation of providing an instruction to change to the logout state; and a step of determining, when detecting the touch operation on the logout key, that the logout operation is performed so as to change from the login state to the logout state, where when in the login state, a predetermined processing start time is reached, reduction processing is performed in which in a screen being presently displaced, a display size of the logout key is maintained and in which a display size of the reduction target element that is a screen element other than the logout key is reduced.

DETAILED DESCRIPTION

An image forming apparatus according to an embodiment of the present disclosure will be described below using, as an example, a multifunctional machine that has a plurality of types of functions such as a copying function and a transmission function (fax function).

<Overall Configuration of Multifunctional Machine>

Figure 1:
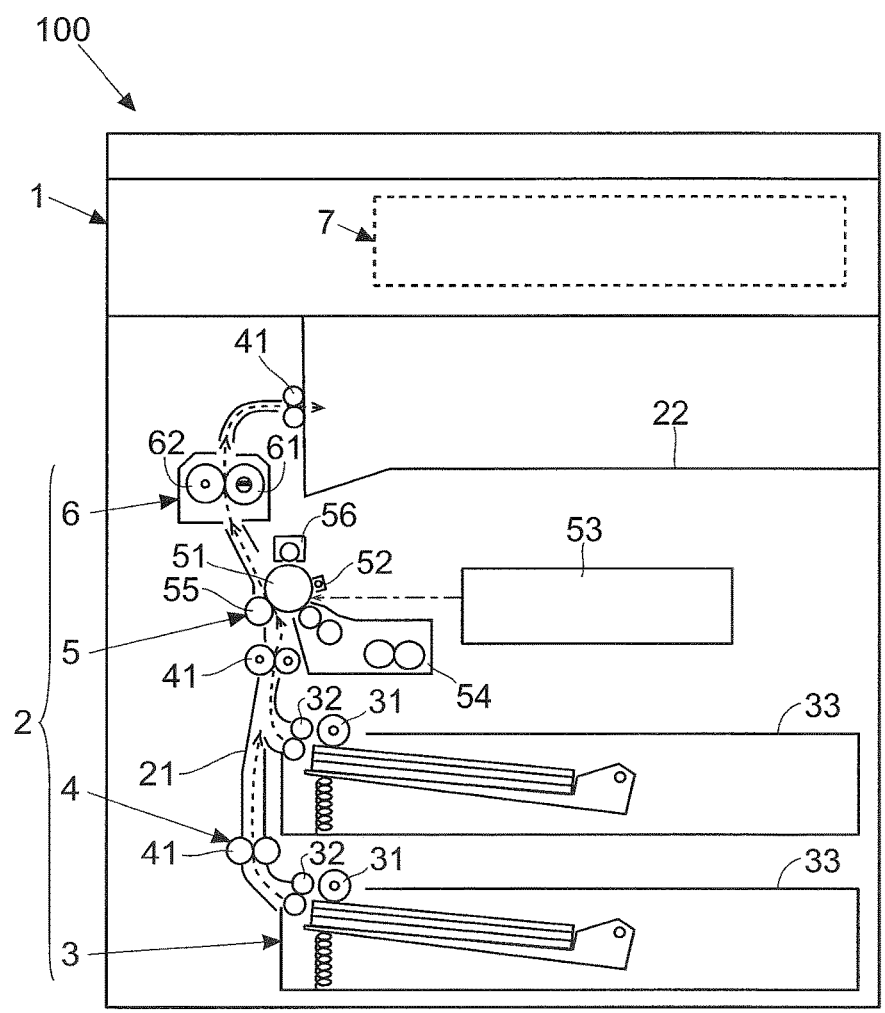
FIG. 1 is a diagram showing an example of a multifunctional machine according to an embodiment of the present disclosure.

As shown in FIG. 1, the multifunctional machine 100 (which corresponds to the "image forming apparatus") includes an image reading portion 1 and a print portion 2. The image reading portion 1 reads an original document to generate image data. The print portion 2 transports a sheet along a sheet transport path 21, and forms a toner image based on the image data. Then, the print portion 2 transfers (prints) the toner image to the sheet being transported, and ejects the printed sheet to an ejection tray 22.

The print portion 2 is formed with a paper feed portion 3, a sheet transport portion 4, an image formation portion 5 and a fixing portion 6. The paper feed portion 3 includes a pickup roller 31 and a paper feed roller pair 32, and supplies sheets stored in a sheet cassette 33 to the sheet transport path 21. The sheet transport portion 4 includes a plurality of transport roller pairs 41 and transports the sheet along the sheet transport path 21.

The image formation portion 5 includes a photosensitive drum 51, a charging device 52, an exposure device 53, a development device 54, a transfer roller 55 and a cleaning device 56. The image formation portion 5 forms the toner image based on the image data and transfers the toner image to the sheet. The fixing portion 6 includes a heating roller 61 and a pressure roller 62, and heats and pressurizes the toner image transferred to the sheet to fix it.

In the multifunctional machine 100, an operation panel 7 is installed. For example, the operation panel 7 is arranged on the front surface side (the area indicated by broken lines of FIG. 1) of the multifunctional machine 100. The operation panel 7 corresponds to a "display input device".

Figure 2:
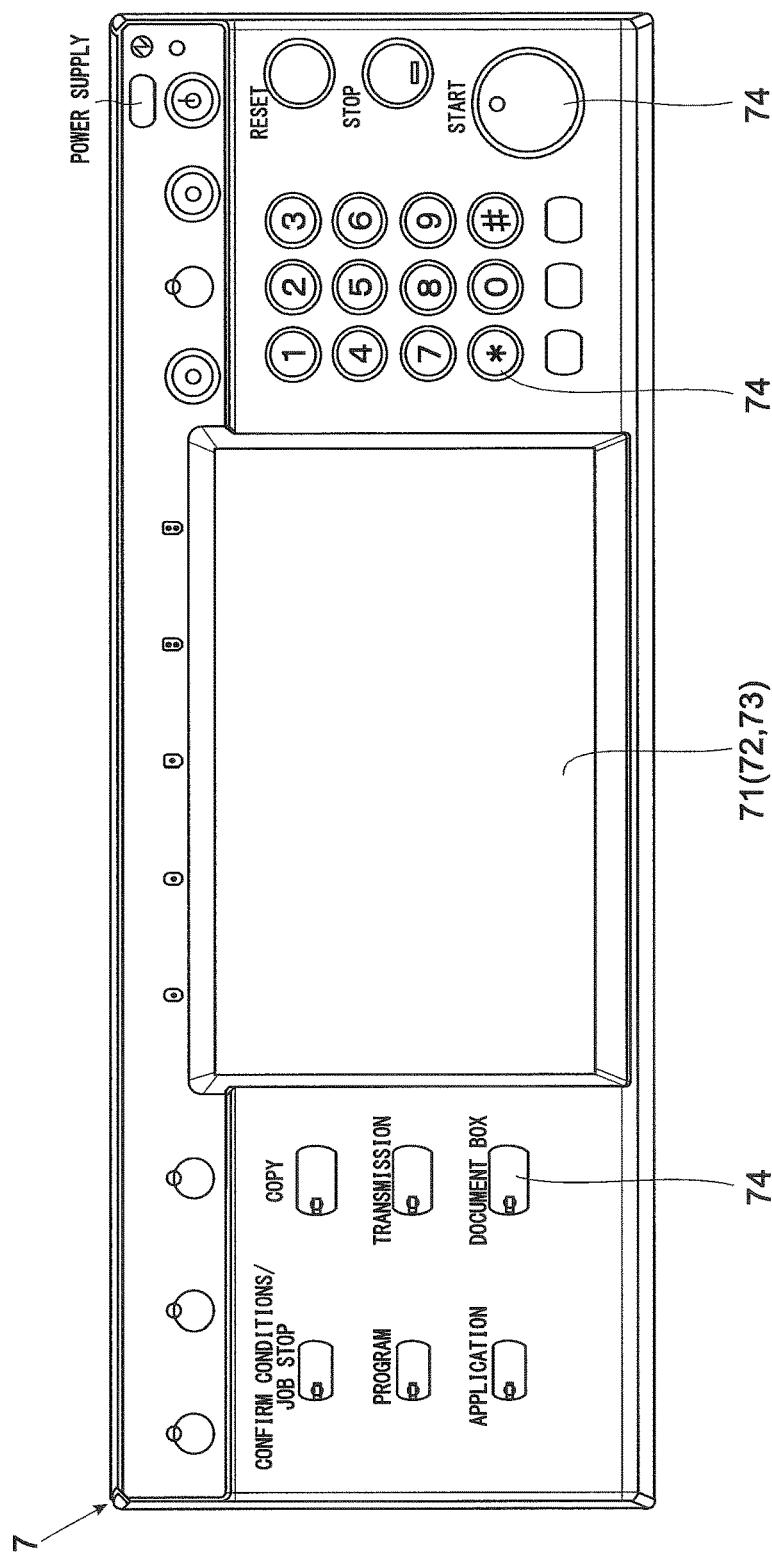
FIG. 2 is a diagram showing an example of an operation panel according to the embodiment of the present disclosure.

In the operation panel 7, as shown in FIG. 2, an operation display portion 71 (touch panel display) is provided. The operation display portion 71 includes a display portion 72 and a touch panel portion 73. The display portion 72 is a display panel such as a liquid crystal display panel or an organic EL display panel. The touch panel portion 73 is a touch panel that can detect a plurality of touch positions at the same time, and is arranged so as to cover the display surface of the display portion 72. The operation display portion 71 displays, on the display portion 72, a soft key, a message and the like for receipt of various types of settings, and receives various types of settings through the touch panel portion 73. In the operation panel 7, various hard keys 74 are also provided such as a start key, a stop key, a rest key and a numeric keypad.

<Hardware Configuration of Multifunctional Machine>

Figure 3:
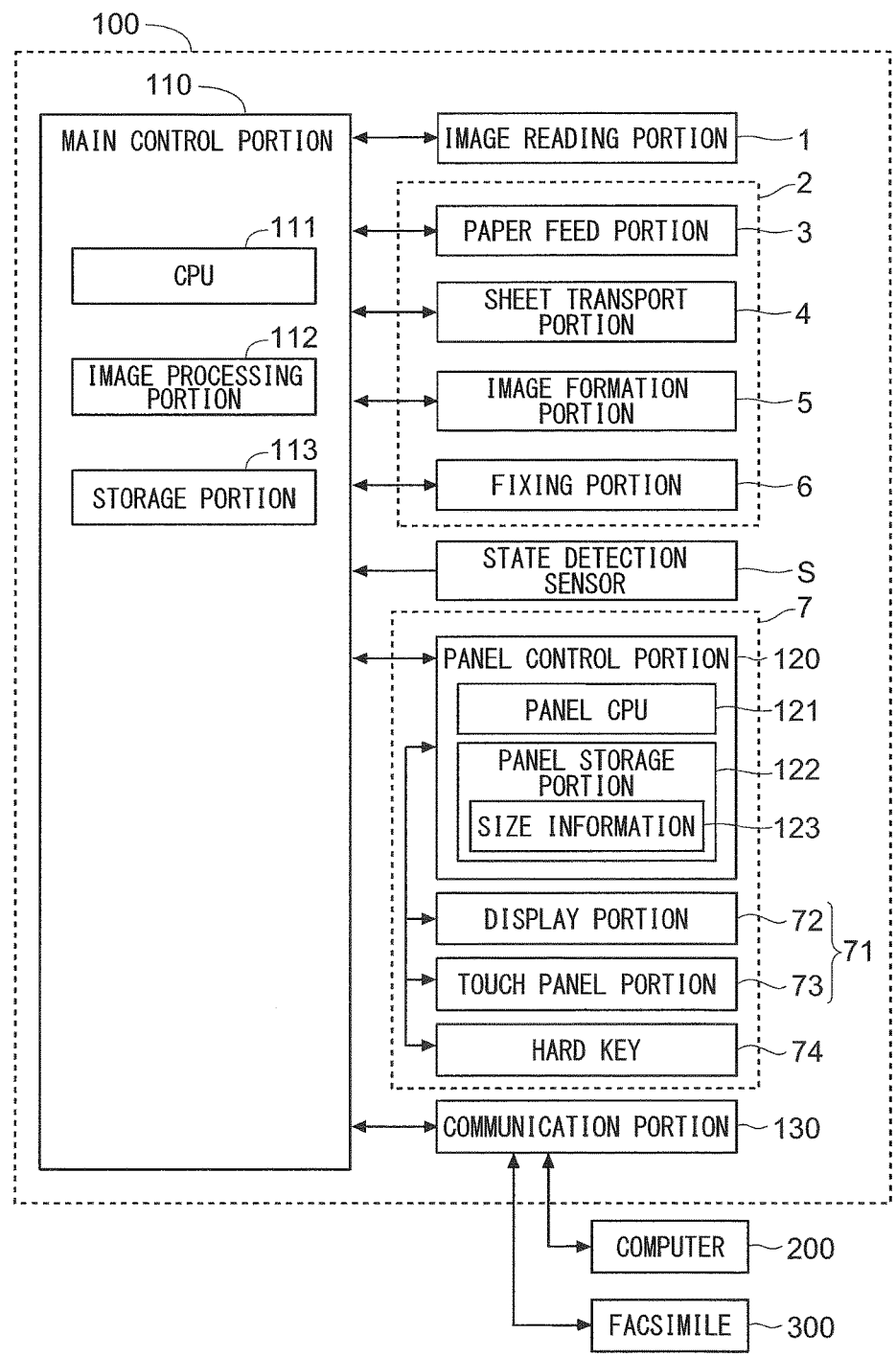
FIG. 3 is a diagram showing an example of a hardware configuration of the multifunctional machine (the operation panel) according to the embodiment of the present disclosure.

As shown in FIG. 3, the multifunctional machine 100 includes a main control portion 110. The main control portion 110 includes a CPU 111, an image processing portion 112 and a storage portion 113. The image processing portion 112 is formed with an ASIC dedicated to image processing and the like, and performs image processing (such as enlargement/reduction, density change and data format change) on the image data. The storage portion 113 is formed with a ROM, a RAM and the like, and stores control programs and data. The main control portion 110 controls, based on the control programs and data stored in the storage portion 113, the operations of the individual portions of the image reading portion 1 and the print portion 2 (the paper feed portion 3, the sheet transport portion 4, the image formation portion 5 and the fixing portion 6).

The main control portion 110 is connected to a panel control portion 120. The panel control portion 120 includes a panel CPU 121 and a panel storage portion 122. The panel storage portion 122 includes memories such as a ROM and a RAM. The panel control portion 120 receives an instruction from the main control portion 110 to control the display operation of the display portion 72 and detects, based on the output of the touch panel portion 73, a touch operation on the screen of the display portion 72. The panel control portion 120 also detects an operation of pressing down the hard keys 74. The panel control portion 120 (the CPU 121) corresponds to a "control portion".

For example, the panel control portion 120 displays, on the display portion 72, a screen on which the soft key and the like are arranged, and when a touch operation is performed on the soft key, the panel control portion 120 detects, based on the output of the touch panel portion 73, the soft key which receives the touch operation. Then, the panel control portion 120 makes the display portion 72 switch the display screen such that a screen associated with the detected soft key is displayed.

The main control portion 110 is also connected to the communication portion 130. The communication portion 130 is connected to an external computer 200 through a network such that the communication portion 130 can communicate with the computer 200. In this way, it is possible to perform printing based on image data transmitted from the computer 200, and it is also possible to transmit, to the computer 200, the image data obtained by reading the original document. A modem or the like may be incorporated in the communication portion 130. In this case, through a network such as a telephone line, it is possible to perform fax communication with an external facsimile 300.

In the main body (portions except the operation panel 7) of the multifunctional machine 100, a plurality of state detection sensors S for detecting the state of the multifunctional machine 100 are installed such as a sensor for detecting the opening and closing of an exterior cover which covers mechanical portions within the machine, a sensor for detecting the opening and closing of an original document cover for pressing the original document, a sensor for detecting the attachment and removal of a container in which toner is stored and a sensor for detecting the attachment and removal of the sheet cassette 33. The main control portion 110 detects the state of the multifunctional machine 100 based on the outputs of the state detection sensors S. When the main control portion 110 detects that the state of the multifunctional machine 100 is changed, the main control portion 110 notifies the panel control portion 120 of machine state information indicating the results of the detection.

<Change from Logout State to Login State>

The operation panel 7 has a login function (function of performing user authentication). For example, in a logout state, the operation panel 7 does not receive, from the user, a setting on a job to be performed in the multifunctional machine 100, and receives user authentication. In other words, in the logout state, the panel control portion 7 does not allow the use of the multifunctional machine 100. As a result of the performance of the user authentication, when it is possible to confirm that a target user is a valid user, the operation panel 7 is brought into the login state to receive, from the user, a setting (including an operation and the like for providing an instruction to start the performance of the job) on the job to be performed in the multifunctional machine 100.

The user authentication performed in the operation panel 7 is performed based on authentication information that is previously registered by the user. The authentication information is information that includes a user name and a password, and is stored in, for example, the panel storage portion 122. When the user authentication is performed, the operation panel 7 receives, from the user, an input of identification information (information including a user name and a password) for performing the user authentication.

Figure 4:
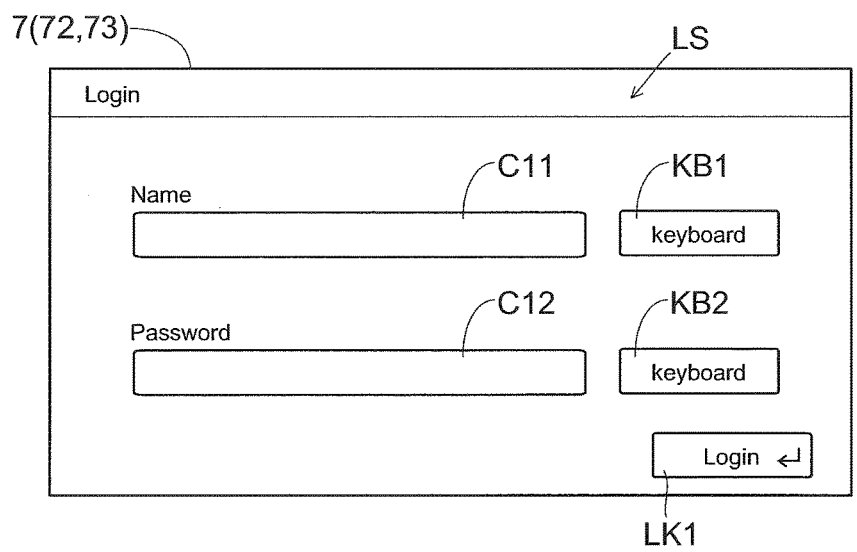
FIG. 4 is a diagram showing an example of a screen (a login screen for inputting identification information) displayed on the operation panel according to the embodiment of the present disclosure.

For example, when the panel control portion 120 receives the input of the identification information, the panel control portion 120 makes the display portion 72 produce a display of a login screen LS as shown in FIG. 4. The login screen LS is a screen for reception of the input of a user name and a password as the identification information, and includes input fields C11 and C12. When a user name is input, the display portion 72 displays the user name in the input field C11 whereas when a password is input, the display portion 72 displays the password in the input field C12.

Figure 5:
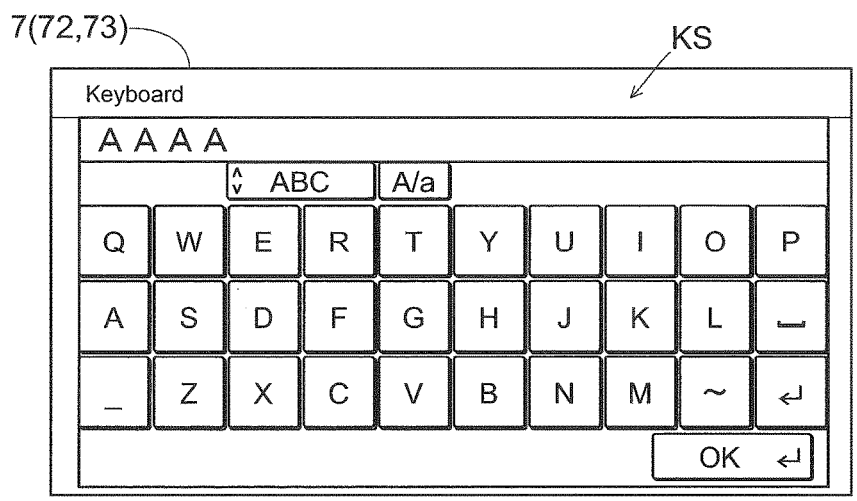
FIG. 5 is a diagram showing an example of a screen (a keyboard screen) displayed on the operation panel according to the embodiment of the present disclosure.

In the login screen LS, keys KB1 and KB2 are arranged. When a touch operation of touching the key KB1 or KB2 is performed on the touch panel portion 73, the panel control portion 120 makes the display portion 72 produce a display of a keyboard screen KS as shown in FIG. 5. In the keyboard screen KS, a software keyboard for reception of an input of the identification information is arranged. The keyboard screen KS that is displayed by the touch operation on the key KB1 is a screen for reception of an input of a user name as the identification information whereas the keyboard screen KS that is displayed by the touch operation on the key KB2 is a screen for reception of an input of a password as the identification information.

Furthermore, in the login screen LS (see FIG. 4), a login key LK1 is arranged. When after the input of the identification information (the user name and the password), a touch operation of touching the login key LK1 is performed on the touch panel portion 73, the panel control portion 120 performs the user authentication based on the authentication information (the information that is previously registered) and the identification information (the information that is input to the login screen LS).

When the panel control portion 120 performs the user authentication, the panel control portion 120 compares the authentication information with the identification information to confirm whether or not the target user is the valid user. For example, when the authentication information matches with the identification information, the panel control portion 120 determines that the target user is the valid user. Then, when the panel control portion 120 can confirm that the target user is the valid user, the panel control portion 120 changes from the logout state to the login state.

<Display Screen in Login State>

Figure 6:
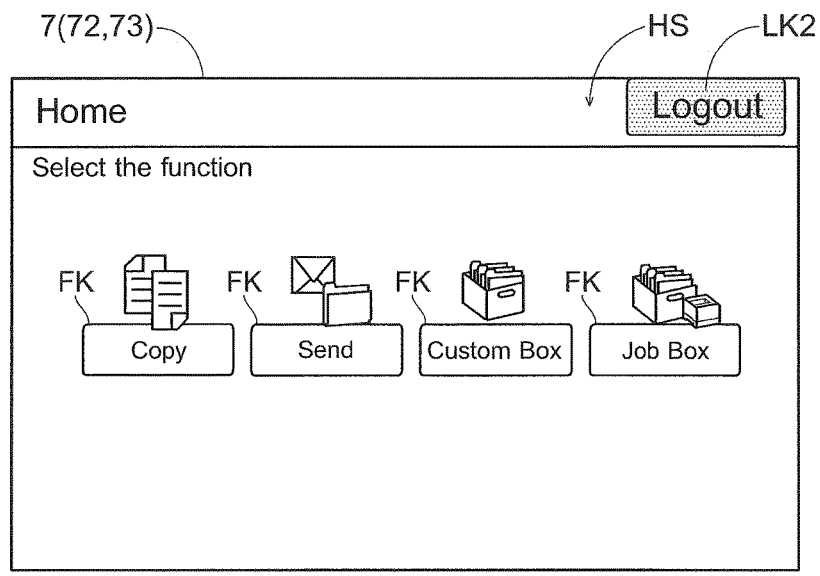
FIG. 6 is a diagram showing an example of a screen (a home screen for selecting a function to be used) displayed on the operation panel according to the embodiment of the present disclosure.

When the state is brought into the login state, the panel control portion 120 makes the display portion 72 produce a display of a home screen HS as shown in FIG. 6. The home screen HS is a screen that is first displayed when the state is brought into the login state, and is a screen for reception of, from the user, an instruction to select which one of a plurality of types of functions incorporated in the multifunctional machine 100 is used. In the home screen HS, a plurality of function keys FK are arranged that correspond to, a plurality of types of functions incorporated in the multifunctional machine 100 such as a copying function (Copy) and a transmission function (Send). When a touch operation of touching any one of the function keys FK is performed on the touch panel portion 73, the panel control portion 120 determines that the function corresponding to the touched function key FK is selected, and makes the display portion 72 produce a display of a setting screen SS (see FIG. 7) for reception of a setting on the job of the selected function.

Figure 7:
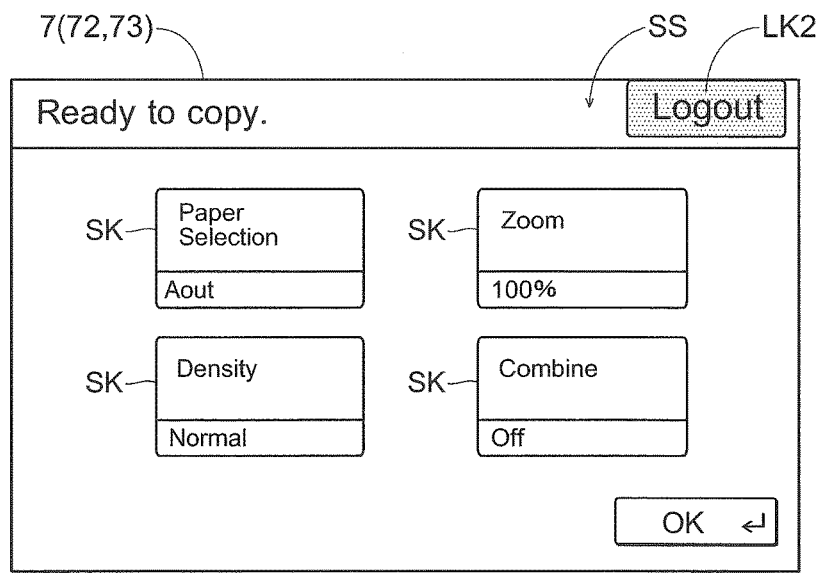
FIG. 7 is a diagram showing an example of a screen (a setting screen for selecting a setting item) displayed on the operation panel according to the embodiment of the present disclosure.

In the setting screen SS, as shown in FIG. 7, a plurality of setting item keys SK for reception of an instruction to select a setting item which is a setting target are arranged. For example, in the setting screen SS of the copying function, a plurality of setting item keys SK that correspond to a plurality of setting items on the copying function such as "sheet selection" and "reduction/enlargement" are arranged. Then, when a touch operation of touching any one of the setting item keys SK is performed on the touch panel portion 73, the panel control portion 120 makes the display portion 72 produce a display of a detail setting screen (not shown) for reception of the setting of the setting item corresponding to the touched setting item key SK.

Figure 8:
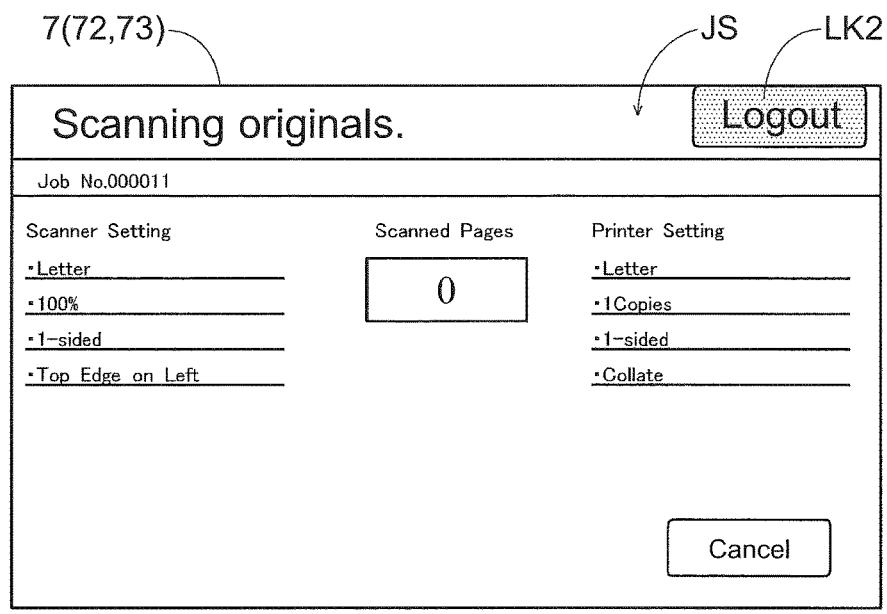
FIG. 8 is a diagram showing an example of a screen (a job screen indicating conditions of performance of a job) displayed on the operation panel according to the embodiment of the present disclosure.

When the job is performed in the multifunctional machine 100, the panel control portion 120 makes the display portion 72 produce a display of a job screen JS (see FIG. 8) that indicates the conditions of the performance of the job. For example, in the job screen JS of a copying job, as shown in FIG. 8, the details of settings on the number of sheets of the original document which are read and the reading, the details of settings on the printing and the like are indicated.

At the time of the completion of the job or at a predetermined time before the completion of the job, the panel control portion 120 makes the display portion 72 switch the display screen from the job screen JS to the home screen HS. For example, in a job accompanied with the reading of the original document (job for outputting an image of the original document based on the image data obtained by reading the original document), in a time elapsed since the completion of the reading of the original document until the completion of the output of the image of the original document, the job screen JS is switched to the home screen HS. As the job accompanied with the reading of the original document, the copying job for printing (outputting) an image of the original document to the sheet, a transmission job for transmitting (outputting) an image of the original document to an external device such as the computer 200 or the facsimile 300 and the like are present.

<Change of Login State to Logout State>

In the login state, the operation panel 7 receives, from the user, an instruction to change to the logout state. Specifically, the panel control portion 120 instructs the display portion 72 to display a logout key LK2 (see FIGS. 6 to 8) for reception of a logout operation which is an operation for providing an instruction to change to the logout state. For example, although not particularly limited, the logout key LK2 is arranged in the right corner of each of the home screen HS (see FIG. 6), the setting screen SS (see FIG. 7) and the job screen JS (see FIG. 8).

When the panel control portion 120 detects, based on an output of the touch panel portion 73, a touch operation on the logout key LK2, the panel control portion 120 determines that a logout operation is performed. Then, the panel control portion 120 makes the operation panel 7 (the display portion 72 and the touch panel portion 73) change from the login state to the logout state.

Here, the operation panel 7 has a function of performing auto-reset processing that is processing for automatically changing the details of settings made by the user to the details of predetermined settings (for example, the details of default settings). Even when the auto-reset processing is performed, the operation panel 7 also changes from the login state to the logout state.

In order to detect timing at which the performance of the auto-reset processing is started, the panel control portion 120 measures an unused time (time elapsed after the completion of a job performed in the multifunctional machine 100 without the use of the multifunctional machine 100) that has elapsed without the use of the main body of the multifunctional machine 100. Here, the panel control portion 120 detects, based on the machine state information notified from the main control portion 110, whether or not the main body of the multifunctional machine 100 is used. The panel control portion 120 also measures an unused time (time elapsed without the performance of a touch operation on the touch panel portion 73 and an operation of pressing down the hard key 74) that has elapsed without the use of the operation panel 7.

Then, the panel control portion 120 determines whether or not the unused time of the main body of the multifunctional machine 100 or the unused time of the operation panel 7 reaches a predetermined auto-reset time. As a result of the determination, when the unused time reaches the auto-reset time, the panel control portion 120 performs the auto-reset processing. The auto-reset time can be changed, and the change of the auto-reset time is received by the operation panel 7. The auto-reset time is stored in the storage portion 122.

<Reduction Processing>

In the present embodiment, when a predetermined processing start time is reached while a screen (for example, the screen shown in FIGS. 6 to 8) in which the logout key LK2 is arranged is being displayed, reduction processing is started in which while the display size of the logout key LK2 in the screen being presently displayed is maintained, screen elements other than the logout key LK2 are reduced as compared with the display size at the present time. Then, after the start of the reduction processing, when a predetermined processing completion time is reached, the reduction processing is completed. When the home screen HS shown in FIG. 6 is taken as an example, a plurality of function keys FK, text images (such as "Home" and "Select the Function") and a screen frame (including ruled lines within the frame) and the like correspond to the screen elements other than the logout key LK2. In the following description, the screen elements (elements to be reduced) other than the logout key LK2 are referred to as reduction target elements RT.

To what size the display size of the reduction target element RT is reduced when the reduction processing is performed is previously determined, and is stored as size information 123 in the panel storage portion 122 (see FIG. 2). For example, the size information is information in which the display size of the reduction target element RT when the reduction processing is performed is classified into display sizes at a plurality of stages, and in which the display sizes at a plurality of stages are individually so as to be decreased as the stage proceeds. How many stages the display size of the reduction target element RT when the reduction processing is performed is classified into is not particularly limited. In the following description, it is assumed that as an example, the display size of the reduction target element RT when the reduction processing is performed is classified into four stages.

Then, when the processing start time is reached, the panel control portion 120 instructs the display portion 72 to reduce, only by one stage, the display size of the reduction target element RT as compared with the display size (the normal display size without being reduced) at the present time. In other words, the display portion 72 displays the display size of the reduction target element RT in the display size at the first stage among the display sizes at the four stages (in the maximum display size among the display sizes at the four stages). Thereafter, the panel control portion 120 instructs the display portion 72 to reduce, stage by stage, the display size of the reduction target element RT such that the display size of the reduction target element RT when the processing completion time is reached is the display size at the fourth stage among the display sizes at the four stages (the minimum display size among the display sizes at the four stages).

As described above, when in the login state, the predetermined processing start time is reached, the reduction processing is performed in which while the display size of the logout key LK2 is maintained, the display size of the reduction target elements RT which are the screen elements other than the logout key LK2 is reduced, and thus the presence of the logout key LK2 is highlighted, with the result that the logout key LK2 is easily noticeable to the user. In this way, even when the screen being presently displayed does not need to be switched to the dedicated screen for reception of a logout operation, it is possible to prompt the user to perform a touch operation (logout operation) on the logout key LK2. In other words, it is possible to prompt the user to perform the logout operation without reducing the convenience of the user (it is possible to reduce the failure to perform the logout operation).

For example, when the reduction processing is performed, the display portion 72 reduces the display size of the reduction target elements RT such that the display position of the reduction target elements RT is located close to the side of the display position of the logout key LK2. In other words, the reduction target elements RT are reduced in a direction toward the logout key LK2 (the direction toward the logout key LK2 is the direction of the reduction). Hence, the reduction target elements RT as a whole are moved close to the logout key LK2. When the display size of the reduction target elements RT is reduced in this way, since it is possible to direct the eyes of the user to the logout key LK2, the effect of inducing the user to perform the logout operation is enhanced.

The reduction processing will be described in detail below with reference to FIGS. 9 to 13. In FIGS. 9 to 13, the region where the reduction target elements RT are not present (region where no image is displayed) is hatched.

An example (first example) where the reduction target elements RT are reduced based on the progress of a predetermined job (for example, the copying job) accompanied with the reading of the original document will first be described with reference to FIGS. 9 and 10.

Figure 9:
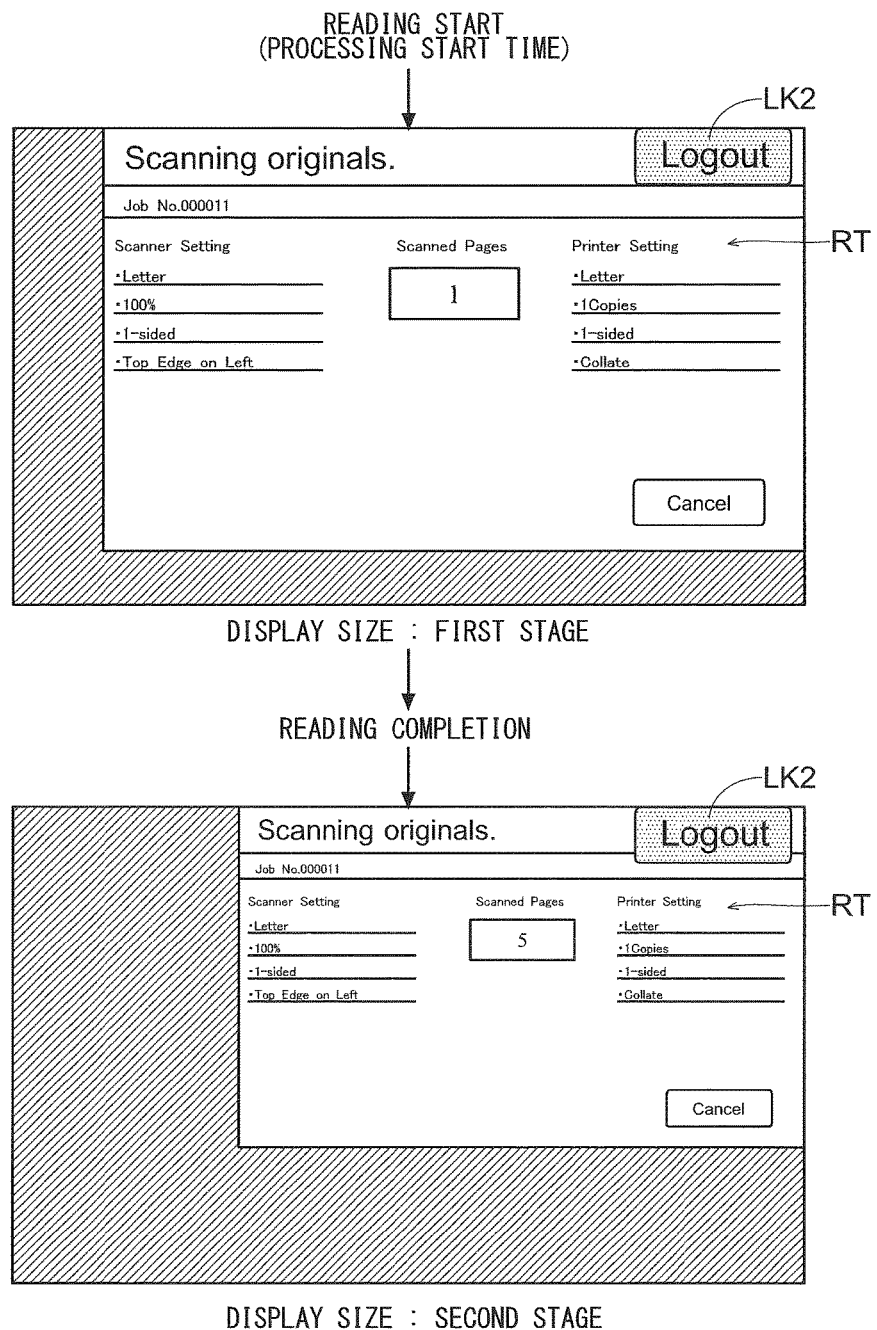
FIG. 9 is a diagram for illustrating the flow of reduction processing performed on the operation panel according to the embodiment of the present disclosure (first example)

As shown in FIG. 9, the processing start time in the first example is when the reading of the original document by the image reading portion 1 is started after the operation panel 7 receives an operation of providing an instruction to start the performance of the copying job (an operation of pressing down the start key). In other words, when the reading of the original document by the image reading portion 1 is started, the panel control portion 120 recognizes that the processing start time is reached.

When the processing start time is reached, the panel control portion 120 instructs the display portion 72 to display the reduction target elements RT in the display size at the first stage among the display sizes at the four stages. At this time, in the job screen JS indicating the conditions of the performance of the copying job, the screen elements other than the logout key LK2 are the reduction target elements RT.

The reduction target elements RT are displayed in the display size at the first stage, and thereafter when the reading of the original document by the image reading portion 1 is completed, the panel control portion 120 recognizes that it is time to switch the display size of the reduction target elements RT. Then, the panel control portion 120 instructs the display portion 72 to display the reduction target elements RT in the display size at the second stage which is one stage lower than the display size at the first stage among the display sizes at the four stages.

Figure 10:
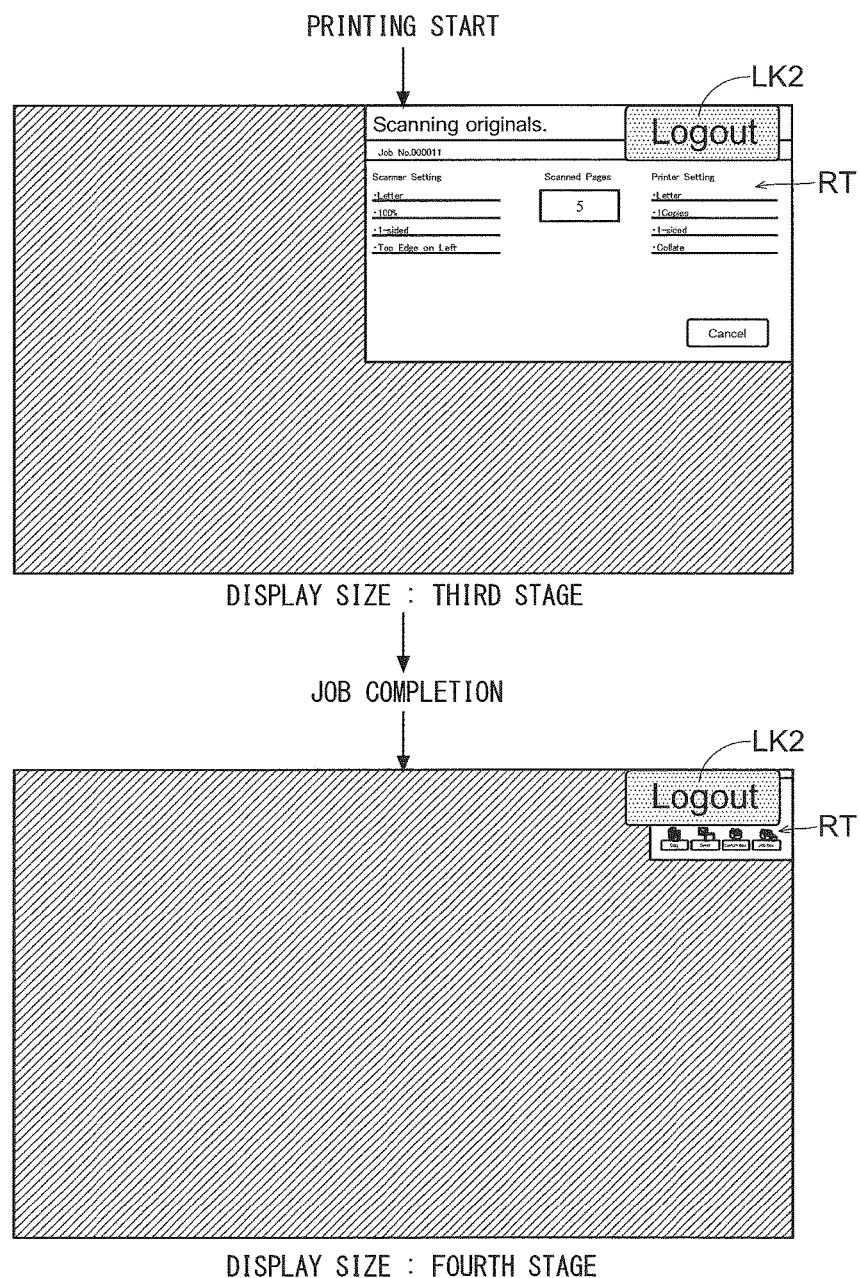
FIG. 10 is a diagram for illustrating the flow of the reduction processing performed on the operation panel according to the embodiment of the present disclosure (first example)

Then, as shown in FIG. 10, when the printing of the image of the original document (the output of the image of the original document) by the print portion 2 is started, the panel control portion 120 recognizes that it is time to switch the display size of the reduction target elements RT. Then, the panel control portion 120 instructs the display portion 72 to display the reduction target elements RT in the display size at the third stage which is one stage lower than the display size at the second stage among the display sizes at the four stages.

Here, the processing completion time in the first example is when the copying job (predetermined job) is completed. Hence, the reduction target elements RT are displayed in the display size at the third stage, and thereafter when the copying job is completed, the panel control portion 120 recognizes that the processing completion time (the time when the display size of the reduction target elements RT is switched) is reached. Then, the panel control portion 120 instructs the display portion 72 to display the reduction target elements RT in the display size at the fourth stage (the minimum display size) which is one stage lower than the display size at the third stage among the display sizes at the four stages. At this time, for example, a job screen JB is switched to the home screen HS. Hence, in the home screen HS, the screen elements other than the logout key LK2 are the reduction target elements RT.

Incidentally, in a case where the reduction target elements RT are reduced based on the progress of the transmission job (predetermined job), when the reading of the original document is started, the reduction target elements RT are displayed in the display size at the first stage whereas when the reading of the original document is completed, the reduction target elements RT are displayed in the display size at the second stage. The processing described above is the same as when the copying job is performed.

Thereafter, when the transmission of the image of the original document (the output of the image of the original document) to the computer 200 or the facsimile 300 by the communication portion 130 is started, the reduction target elements RT are displayed in the display size at the third stage whereas when the transmission job is completed, the reduction target elements RT are displayed in the display size at the fourth stage.

In the first example, when the reading of the original document is started, the display portion 72 recognizes that the processing start time is reached, and thus the reduction target elements RT are displayed in the display size at the first stage, when the reading of the original document is completed, the reduction target elements RT are displayed in the display size at the second stage which is one stage lower than the display size at the first stage, when the output of the image of the original document is started, the reduction target elements RT are displayed in the display size at the third stage which is one stage lower than the display size at the second stage and when the predetermined job is completed, the reduction target elements are displayed in the minimum display size (the display size at the fourth stage) which is one stage lower than the display size at the third stage. In this configuration, while the predetermined job is being performed, the attention of the user is directed to the display portion 72 (the logout key LK2). Then, when the predetermined job is completed, since only the display size of the logout key LK2 is maintained so as not to be reduced, the eyes of the user are directed to the logout key LK2. In this way, when the predetermined job is completed, it is possible to make the user perform the logout operation quickly.

After the display size of the reduction target elements RT is switched to the display size at the first stage when the reading of the original document by the image reading portion 1 is started, regardless of the progress of the job, the display size of the reduction target elements RT may be reduced stage by stage at predetermined time intervals.

An example (second example) where the reduction target elements RT are reduced based on the remaining time until the start of the performance of the auto-reset processing will then be described with reference to FIGS. 11 and 12.

Figure 11:
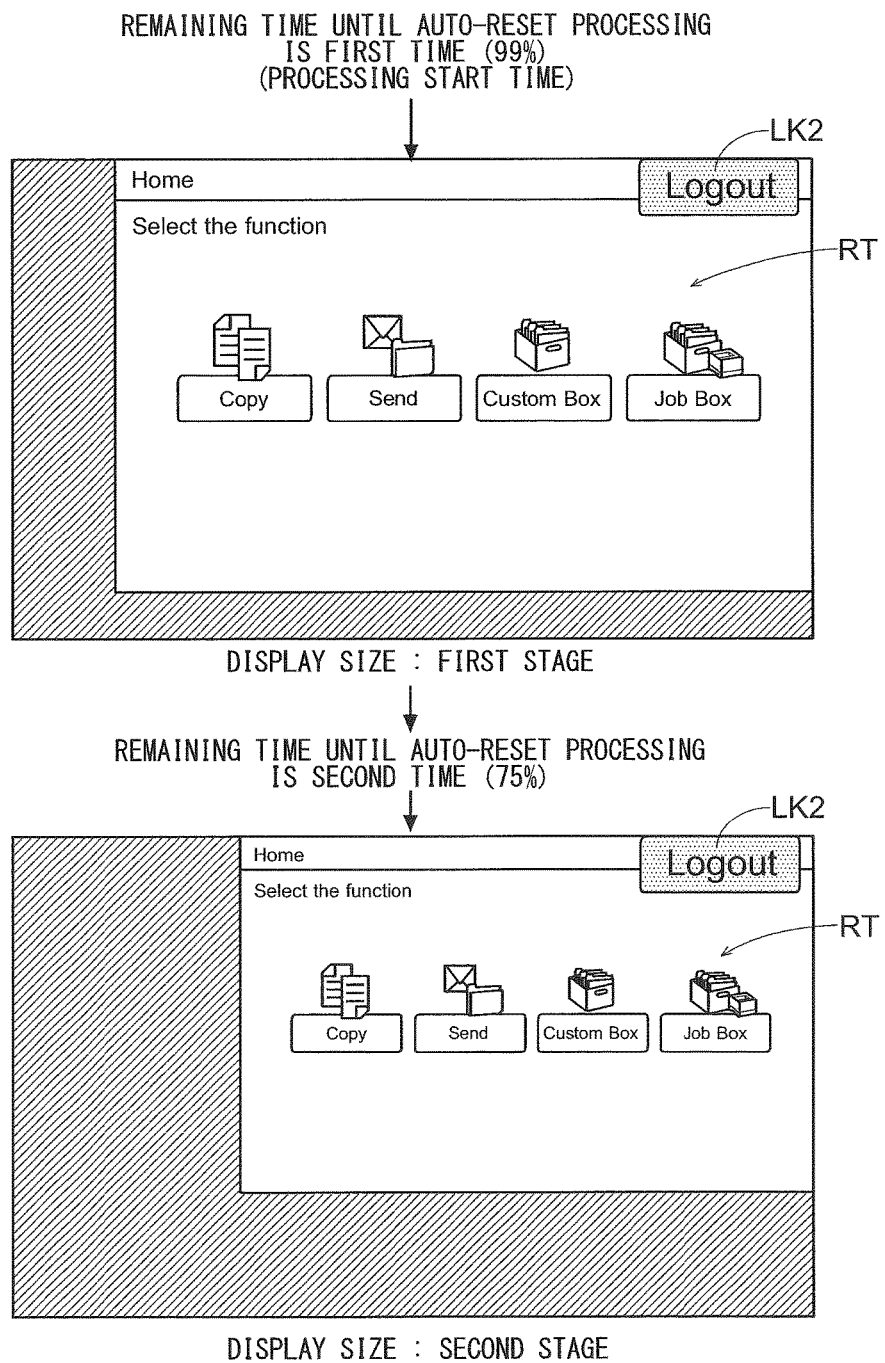
FIG. 11 is a diagram for illustrating the flow of the reduction processing performed on the operation panel according to the embodiment of the present disclosure (second example)

As shown in FIG. 11, the processing start time in the second example is when a predetermined time shorter than the auto-reset time has elapsed without the use of the main body of the multifunctional machine 100 or the operation panel 7 (when the unused time reaches the predetermined time), and is when the remaining time until the start of the performance of the auto-reset processing reaches a predetermined first time (for example, 99% of the auto-reset time). In other words, when the remaining time until the start of the performance of the auto-reset processing reaches the first time, the panel control portion 120 recognizes that the processing start time is reached.

Then, when the processing start time is reached, the panel control portion 120 instructs the display portion 72 to display the reduction target elements RT in the display size at the first stage among the display sizes at the four stages.

Here, since the job is not performed in the multifunctional machine 100, the home screen HS or the setting screen SS is displayed on the display portion 72. Hence, the screen elements other than the logout key LK2 in the home screen HS or the screen elements other than the logout key LK2 in the setting screen SS are the reduction target elements RT (in FIGS. 11 and 12, as an example, the home screen HS is shown).

When the remaining time until the start of the performance of the auto-reset processing reaches a predetermined second time (for example, 75% of the auto-reset time) after the reduction target elements RT is displayed in the display size at the first stage, the panel control portion 120 recognizes that it is time to switch the display size of the reduction target elements RT. Then, the panel control portion 120 instructs the display portion 72 to display the reduction target elements RT in the display size at the second stage which is one stage lower than the display size at the first stage among the display sizes at the four stages.

Figure 12:
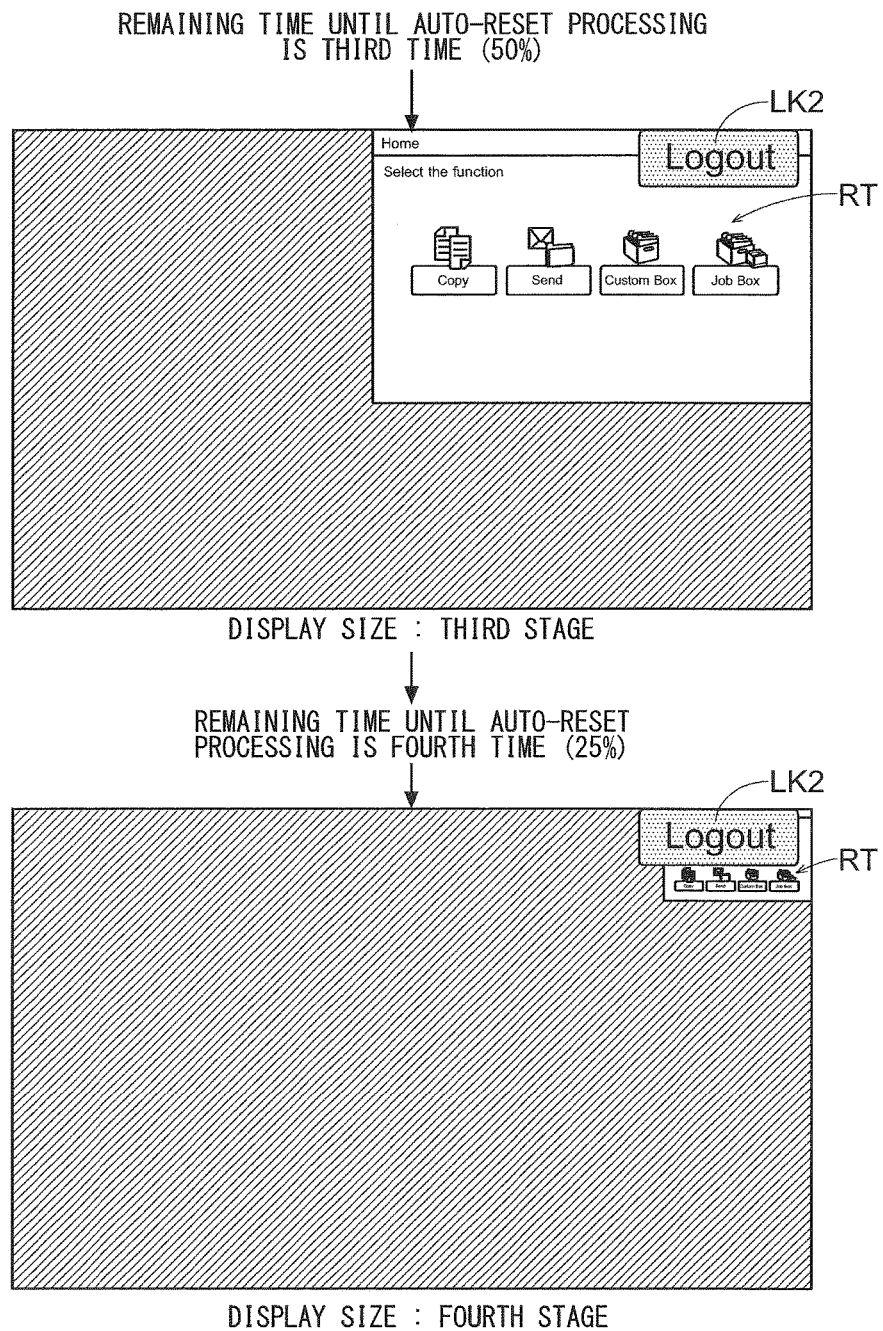
FIG. 12 is a diagram for illustrating the flow of the reduction processing performed on the operation panel according to the embodiment of the present disclosure (second example)

Then, as shown in FIG. 12, when the remaining time until the start of the performance of the auto-reset processing reaches a predetermined third time (for example, 50% of the auto-reset time), the panel control portion 120 recognizes that it is time to switch the display size of the reduction target elements RT. Then, the panel control portion 120 instructs the display portion 72 to display the reduction target elements RT in the display size at the third stage which is one stage lower than the display size at the second stage among the display sizes at the four stages.

Here, the processing completion time in the second example is when the remaining time until the start of the performance of the auto-reset processing reaches a predetermined fourth time (for example, 25% of the auto-reset time). Hence, the reduction target elements RT are displayed in the display size at the third stage, and thereafter when the remaining time until the start of the performance of the auto-reset processing reaches the fourth time, the panel control portion 120 recognizes that the processing completion time (the time when the display size of the reduction target elements RT is switched) is reached. Then, the panel control portion 120 instructs the display portion 72 to display the reduction target elements RT in the display size at the fourth stage (the minimum display size) which is one stage lower than the display size at the third stage among the display sizes at the four stages.

In the second example, when the unused time reaches the predetermined time shorter than the auto-reset time, the display portion 72 recognizes that the processing start time is reached and thus displays the reduction target elements RT in the display size at the first stage, and thereafter until the unused time reaches the auto-reset time, the display size of the reduction target elements RT is reduced stage by stage such that the display size of the reduction target elements RT is the minimum display size. In this way, even when the job is not performed in the multifunctional machine 100, in the login state, it is possible to prompt the user to perform the logout operation.

An example (third example) where the reduction target elements RT are reduced based on the progress of a predetermined job (for example, the copying job) accompanied with the reading of the original document and the remaining time until the start of the performance of the auto-reset processing will then be described with reference to FIGS. 13 and 12.

Figure 13:
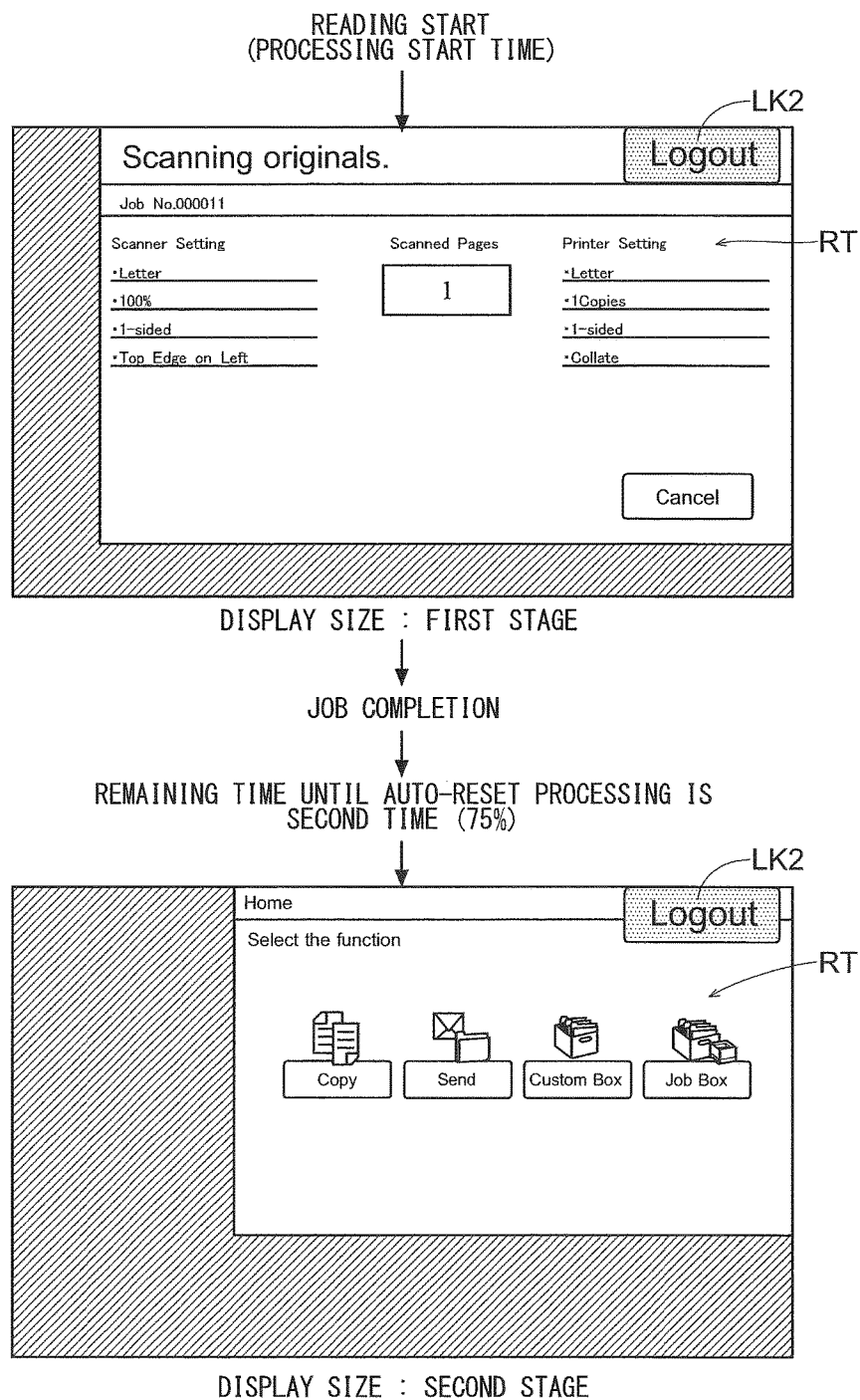
FIG. 13 is a diagram for illustrating the flow of the reduction processing performed on the operation panel according to the embodiment of the present disclosure (third example)

As shown in FIG. 13, the processing start time in the third example is when the operation panel 7 receives an operation of providing an instruction to start the performance of the copying job and thereafter the reading of the original document by the image reading portion 1 is started (the same as in the first example). In other words, when the reading of the original document by the image reading portion 1 is started, the panel control portion 120 instructs the display portion 72 to display the reduction target elements RT in the display size at the first stage among the display sizes at the four stages.

Thereafter, the panel control portion 120 instructs the display portion 72 to continue to display the reduction target elements RT in the display size at the first stage until the copying job (predetermined job) is completed. In other words, after the reduction target elements RT are displayed in the display size at the first stage, the display size of the reduction target elements RT remains unchanged until the completion of the copying job.

When the reduction target elements RT are displayed in the display size at the first stage, then the copying job is completed and the remaining time until the start of the performance of the auto-reset processing reaches the second time, the panel control portion 120 recognizes that it is time to switch the display size of the reduction target elements RT. Then, the panel control portion 120 instructs the display portion 72 to display the reduction target elements RT in the display size at the second stage which is one stage lower than the display size at the first stage among the display sizes at the four stages.

The processing after the reduction target elements RT are displayed in the display size at the second stage is the same as in the second example (see FIG. 12). Specifically, when the remaining time until the start of the performance of the auto-reset processing reaches the third time, the panel control portion 120 instructs the display portion 72 to display the reduction target elements RT in the display size at the third stage among the display sizes at the four stages. When the remaining time until the start of the performance of the auto-reset processing reaches the fourth time, the panel control portion 120 instructs the display portion 72 to display the reduction target elements RT in the display size at the fourth stage (the minimum display size) among the display sizes at the four stages.

In the third example, when the reading of the original document is started, the display portion 72 recognizes that the processing start time is reached, displays the reduction target elements RT in the display size at the first stage and continues to display the reduction target elements RT in the display size at the first stage until the completion of the predetermined job, and until the unused time reaches the auto-reset time after the completion of the predetermined job, the display size of the reduction target elements RT is reduced stage by stage after the completion of the predetermined job such that the display size of the reduction target elements RT reaches the minimum display size. In this configuration, it is possible to reduce the occurrence of a problem in which when a small number of sheets of the original document are read, the display size of the reduction target elements RT reaches the minimum display size for a short period of time.

<Reception of Enlargement Operation>

The panel control portion 120 detects whether or not an enlargement operation which is a predetermined touch operation is performed on the touch panel portion 73 when the display portion 72 reduces the display size of the reduction target elements RT. Then, when the panel control portion 120 detects that the enlargement operation is performed on the touch panel portion 73, the panel control portion 120 instructs the display portion 72 to return the display size of the reduction target elements RT to the display size immediately before the reduction processing (the normal display size without being reduced).

Figure 14:
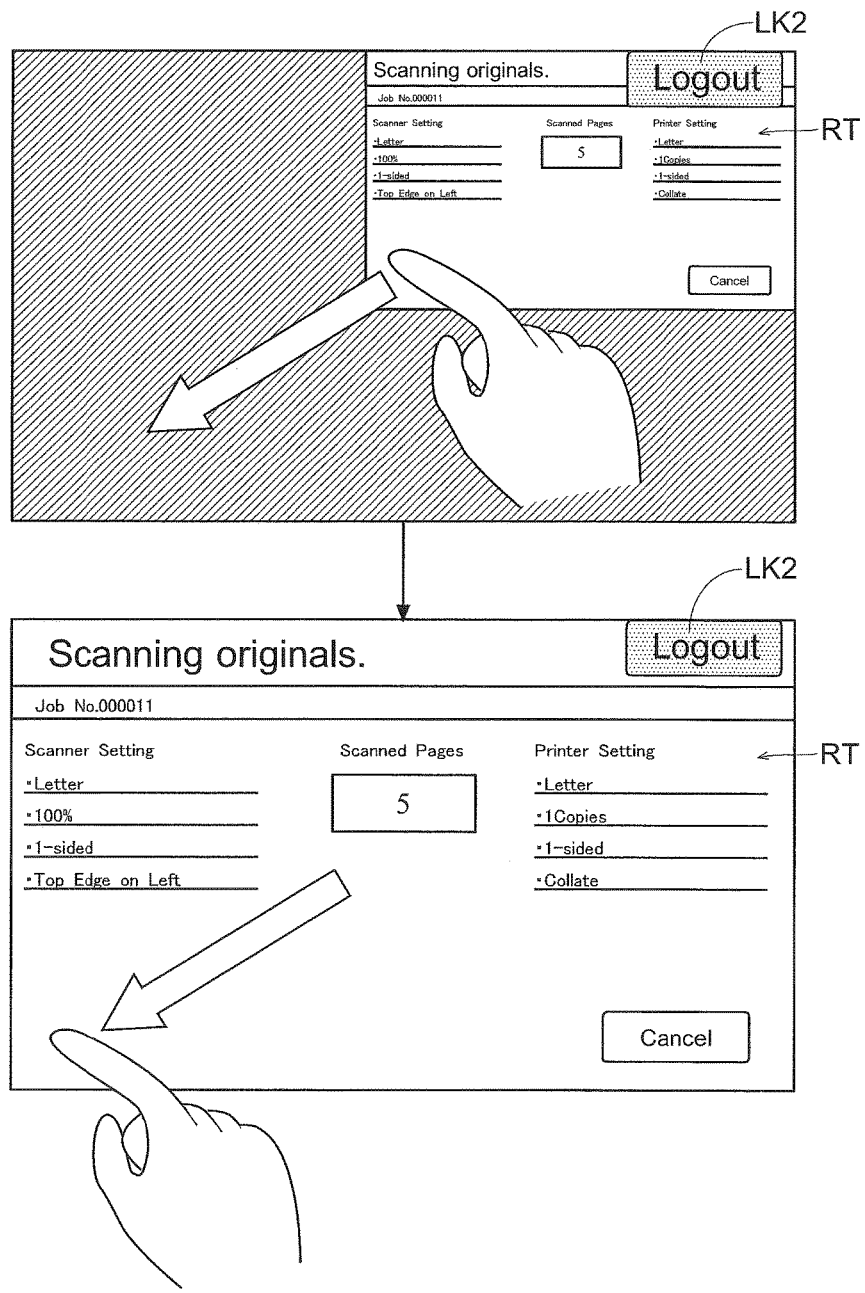
FIG. 14 is a diagram for illustrating an enlargement operation performed when reduction target elements are enlarged on the operation panel according to the embodiment of the present disclosure.

For example, as shown in FIG. 14, the touch panel portion 73 receives, as the enlargement operation, an operation of moving, while touching the reduction target elements RT, the touch position in a direction away from the logout key LK2 and cancelling the touch (drag-and-drop operation). In FIG. 14, the direction of the movement of the touch position is indicated by a white arrow.

The touch operation received as the enlargement operation is not particularly limited. For example, an operation of flicking the reduction target elements RT with a finger (flick operation) may be set to the enlargement operation. Alternatively, an operation of touching the reduction target elements RT consecutively twice may be set to the enlargement operation or an operation of simultaneously touching two or more points of the reduction target elements RT may be set to the enlargement operation.

In this configuration, even when the display size of the reduction target elements RT is reduced, since the enlargement operation is performed to return the display size of the reduction target elements RT to the original display size, it is possible to easily confirm the details of the reduction target elements RT.

<Notification for Prompting Performance of Logout Operation>

Figure 15:
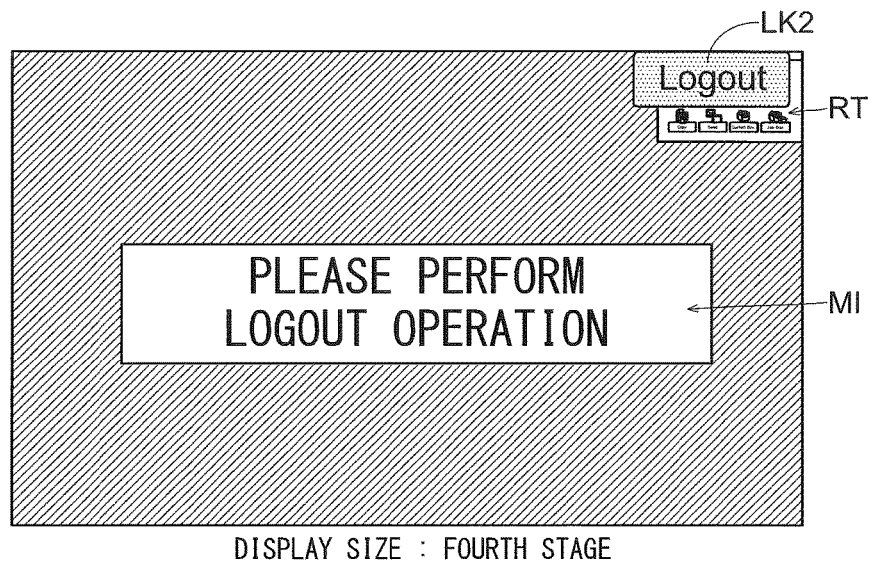
FIG. 15 is a diagram for illustrating a message image displayed in a region where the reduction target elements are not present on the operation panel according to the embodiment of the present disclosure.
Figure 16:
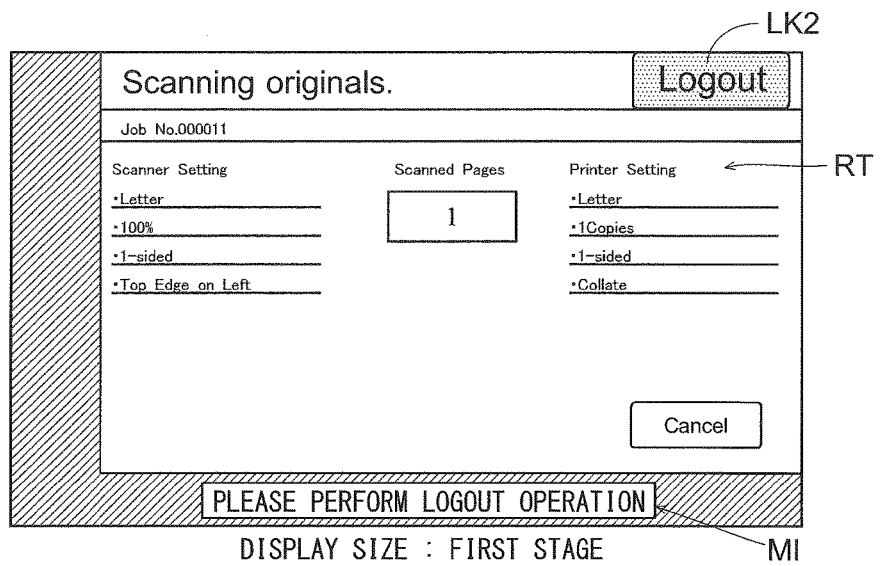
FIG. 16 is a diagram for illustrating a message image displayed in the region where the reduction target elements are not present on the operation panel according to the embodiment of the present disclosure.

When the display portion 72 reduces the display size of the reduction target elements RT, the panel control portion 120 instructs the display portion 72 to display a predetermined image in a region where the reduction target elements RT are not present. As an example, the display portion 72 displays, as shown in FIG. 15, a message image MI (for example, a text "please perform a logout operation") for prompting the user to perform the logout operation in the region where the reduction target elements RT are not present. Although FIG. 15 shows an example where the message image IM is displayed when the reduction target elements RT are displayed in the display size at the fourth stage (the minimum display size), the timing at which the message image IM is displayed is not particularly limited. For example, the message image MI may be displayed when the reduction target elements RT are displayed in the display size at the first stage (see FIG. 16). Alternatively, while the reduction processing is performed, the display of the message image MI may be continued. The details of the message indicated by the message image MI can be changed, and a message other than a message for prompting the user to perform the logout operation may be displayed as the message image MI.

Here, as the display size of the reduction target elements RT is stepwise decreased, the region where the reduction target elements RT are not present is stepwise increased. In other words, the space for arranging the message image MI is stepwise increased. Hence, when the display of the message image MI is continued while the reduction processing is performed, each time the display size of the reduction target elements RT is decreased, the display size of the message image MI may be increased. Alternatively, each time the display size of the reduction target elements RT is decreased, the details of the message indicated by the message image MI may be changed (for example, the number of characters in the message may be increased).

In this configuration, it is possible to more reliably prompt the user to perform the logout operation.

It should be considered that the embodiment disclosed herein is illustrative in all respects and is not restrictive. The scope of the present disclosure is indicated not by the description of the embodiment discussed above but by the scope of claims, and furthermore, all modifications within the meaning and scope equivalent to the scope of claims are included.

What is claimed is:

1. A display input device that is installed in an image forming apparatus, that receives an input of identification information for confirming whether or not a user is a valid user in a logout state where a setting on a job to be performed in the image forming apparatus is not received and that changes, when it is confirmed that the user inputting the identification information is the valid user, to a login state where the setting on the job to be performed in the image forming apparatus is received, the display input device comprising:

a display portion that displays, in the login state, a logout key for receiving a logout operation which is an operation of providing an instruction to change to the logout state;

a touch panel portion for detecting a touch operation on a screen of the display portion;

a control portion that determines, when detecting the touch operation on the logout key based on an output of the touch panel portion, that the logout operation is performed so as to change from the login state to the logout state; and a storage portion, wherein when in the login state, a predetermined processing start time is reached, the display portion performs reduction processing in which in the screen being presently displayed, a display size of the logout key is maintained and in which a display size of a reduction target element that is a screen element other than the logout key is reduced, the storage portion stores size information in which the display size of the reduction target element when the reduction processing is performed is classified into display sizes at a plurality of stages and in which the display sizes at the plurality of stages are individually determined such that as the stage proceeds, the display size is decreased, when the processing start time is reached, the display portion displays the reduction target element in a display size at a first stage among the display sizes at the plurality of stages, and then reduces, stage by stage, the display size of the reduction target element such that the display size of the reduction target element when a processing completion time previously determined as a time when the reduction processing is completed is reached is a minimum display size among the display sizes at the plurality of stages, the processing start time is when the job is started in the image forming apparatus, and when a predetermined job of outputting an image of an original document based on image data obtained by reading the original document is performed in the image forming apparatus, the display portion
determines, when the reading of the original document is started, that the processing start time is reached and displays the reduction target element in the display size at the first stage,
displays, when the reading of the original document is completed, the reduction target element in a display size at a second stage which is smaller than the display size at the first stage, displays, when the output of the image of the original document is started, the reduction target element in a display size at a third stage which is smaller than the display size at the second stage, and displays, when the predetermined job is completed, the reduction target element in the minimum display size which is smaller than the display size at the third stage.

2. A display input device that is installed in an image forming apparatus, that receives an input of identification information for confirming whether or not a user is a valid user in a logout state where a setting on a job to be performed in the image forming apparatus is not received and that changes, when it is confirmed that the user inputting the identification information is the valid user, to a login state where the setting on the job to be performed in the image forming apparatus is received, the display input device comprising:

a display portion that displays, in the login state, a logout key for receiving a logout operation which is an operation of providing an instruction to change to the logout state;

a touch panel portion for detecting a touch operation on a screen of the display portion;

a control portion that determines, when detecting the touch operation on the logout key based on an output of the touch panel portion, that the logout operation is performed so as to change from the login state to the logout state; and a storage portion, wherein when in the login state, a predetermined processing start time is reached, the display portion performs reduction processing in which in the screen being presently displayed, a display size of the logout key is maintained and in which a display size of a reduction target element that is a screen element other than the logout key is reduced, the storage portion stores size information in which the display size of the reduction target element when the reduction processing is performed is classified into display sizes at a plurality of stages and in which the display sizes at the plurality of stages are individually determined such that as the stage proceeds, the display size is decreased, when the processing start time is reached, the display portion displays the reduction target element in a display size at a first stage among the display sizes at the plurality of stages, and then reduces, stage by stage, the display size of the reduction target element such that the display size of the reduction target element when a processing completion time previously determined as a time when the reduction processing is completed is reached is a minimum display size among the display sizes at the plurality of stages, the processing start time is when the job is started in the image forming apparatus, the control portion is configured so as to perform auto-reset processing in which an unused time that is a time elapsed without use of the image forming apparatus or the display input device is measured, and in which when the unused time reaches a predetermined auto-reset time, a detail of a setting made by the user is automatically changed to a predetermined detail of the setting, and when a predetermined job of outputting an image of an original document based on image data obtained by reading the original document is performed in the image forming apparatus, the display portion determines, when the reading of the original document is started, that the processing start time is reached and displays the reduction target element in the display size at the first stage, continues to display the reduction target element in the display size at the first stage until the predetermined job is completed, and reduces, until the unused time after the completion of the predetermined job reaches the auto-reset time, stage by stage, the display size of the reduction target element after the completion of the predetermined job such that the reduction target element is displayed in the minimum display size.

* * * * *